United States Patent
Silverman et al.

(10) Patent No.: US 10,877,160 B2
(45) Date of Patent: Dec. 29, 2020

(54) COMPENSATING FOR ACCESS POINT ORIENTATION ERRORS WITH RESPECT TO A PREDEFINED AREA ORIENTATION

(71) Applicant: Cisco Technology, Inc., San Jose, CA (US)

(72) Inventors: Matthew A. Silverman, Shaker Heights, OH (US); Paul J. Stager, Akron, OH (US); Santosh G. Pandey, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 315 days.

(21) Appl. No.: 15/904,928

(22) Filed: Feb. 26, 2018

(65) Prior Publication Data

US 2019/0265367 A1 Aug. 29, 2019

(51) Int. Cl.
| | | |
|---|---|---|
| *H04W 4/02* | (2018.01) | |
| *H04W 88/08* | (2009.01) | |
| *G01S 19/40* | (2010.01) | |
| *G01S 19/05* | (2010.01) | |

(52) U.S. Cl.
CPC .............. *G01S 19/40* (2013.01); *G01S 19/05* (2013.01); *H04W 4/025* (2013.01); *H04W 88/08* (2013.01)

(58) Field of Classification Search
CPC ........ G01S 19/40; G01S 19/05; H04W 24/08; H04W 64/00; H04W 88/02; H04W 88/08
See application file for complete search history.

(56) References Cited

U.S. PATENT DOCUMENTS

| | | |
|---|---|---|
| 6,754,488 B1 | 6/2004 | Won et al. |
| 6,909,399 B1 | 6/2005 | Zegelin et al. |
| 9,310,461 B2 | 4/2016 | Pandey |
| 2003/0125046 A1 | 7/2003 | Riley et al. |
| 2004/0203539 A1 | 10/2004 | Benes et al. |
| 2004/0203931 A1 | 10/2004 | Karaoguz |
| 2005/0130669 A1 | 6/2005 | Mizugaki et al. |

(Continued)

OTHER PUBLICATIONS

Cherntanomwong, et al., "Array Calibration using Measured Data for Precise Angle-of-Arrival Estimation", IWS 2005 / WPMC'05—Aalborg, Denmark, Sep. 18-22, 2005, 5 pgs.

(Continued)

*Primary Examiner* — Erin F Heard
*Assistant Examiner* — Donald H B Braswell
(74) *Attorney, Agent, or Firm* — Edell, Shapiro & Finnan, LLC

(57) ABSTRACT

A method for adjusting an installation orientation of an access point within a predefined area with an associated orientation is disclosed. The method includes obtaining, at a computing apparatus, angle of arrival estimates from each access point based on a wireless transmission from a wireless mobile device. The computing device generates an estimated location of the wireless mobile device based on the angle of arrival estimates. Next, the computing device determines an orientation error for each wireless access point based on the angle of arrival estimate of the wireless mobile device and the estimated location of the wireless mobile device. The computing device generates an adjusted orientation of one or more of the access points based on the orientation error of the access point, thereby aligning the adjusted orientation with the orientation of the predefined area.

20 Claims, 10 Drawing Sheets

(56) References Cited

U.S. PATENT DOCUMENTS

| | | |
|---|---|---|
| 2008/0186234 A1 | 8/2008 | Alles et al. |
| 2008/0287139 A1 | 11/2008 | Carlson et al. |
| 2010/0159958 A1 | 6/2010 | Naguib et al. |
| 2014/0018095 A1 | 1/2014 | Parvizi et al. |
| 2017/0187504 A1* | 6/2017 | Qian .................... H04L 5/0023 |
| 2018/0049154 A1* | 2/2018 | Choi .................... H04W 16/28 |
| 2018/0199252 A1* | 7/2018 | Pawar .................. H04W 36/22 |
| 2019/0037529 A1* | 1/2019 | Edge .................... H04B 7/0897 |
| 2020/0053740 A1* | 2/2020 | Wigren ............... H04W 64/006 |

OTHER PUBLICATIONS

Yedidia, Jonathan S. et al., "Understanding Belief Propagation and its Generalizations", www.merl.com/publications/docs/TR2001-22.pdf, Nov. 2001, 36 pages.

\* cited by examiner

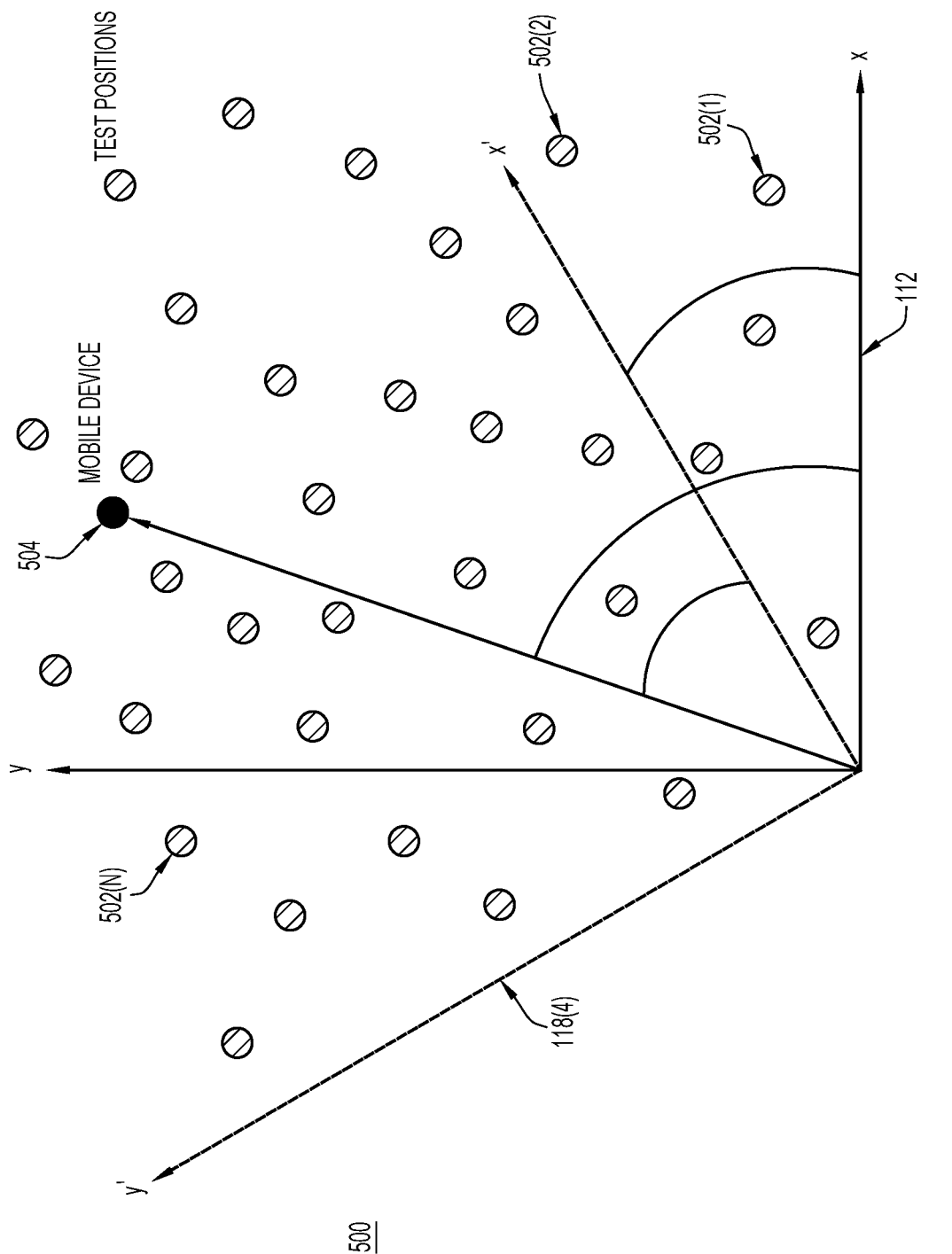

600

602 — OBTAINING, FROM THE PLURALITY OF WIRELESS ACCESS POINTS LOCATED WITHIN A PREDEFINED AREA, AN ANGLE OF ARRIVAL ESTIMATE OF A TRANSMISSION FROM A WIRELESS MOBILE DEVICE RECEIVED AT A PLURALITY OF ANTENNAS OF EACH RESPECTIVE WIRELESS ACCESS POINT, EACH WIRELESS ACCESS POINT HAVING A RESPECTIVE DEPLOYMENT ORIENTATION

604 — GENERATING AN ESTIMATED LOCATION OF THE WIRELESS MOBILE DEVICE BASED ON THE ANGLE OF ARRIVAL ESTIMATE AT EACH OF THE PLURALITY OF WIRELESS ACCESS POINTS

606 — DETERMINING AN ORIENTATION ERROR FOR EACH WIRELESS ACCESS POINT BASED ON THE ANGLE OF ARRIVAL ESTIMATE AT THE PLURALITY OF WIRELESS ACCESS POINTS AND THE ESTIMATED LOCATION OF THE WIRELESS MOBILE DEVICE

608 — GENERATING, BASED ON THE ORIENTATION ERROR FOR EACH WIRELESS ACCESS POINT, AN ADJUSTED ORIENTATION FOR AT LEAST ONE OF THE WIRELESS ACCESS POINTS THAT IS ALIGNED WITH AN ORIENTATION OF THE PREDEFINED AREA

FIG.6

COMPENSATING FOR ACCESS POINT ORIENTATION ERRORS WITH RESPECT TO A PREDEFINED AREA ORIENTATION

TECHNICAL FIELD

The present disclosure relates to location estimation in wireless networks.

BACKGROUND

Users of wireless mobile devices, such as cell phones, may want to use the cell phone's navigation capabilities to navigate a predefined area, such as an indoor structure. Additionally, operators of such predefined areas may wish to provide location-based services to their customers using mobile devices. However, global positioning system (GPS) signals for the mobile device within the predefined area may be weak, which may cause the estimated location of the user within the predefined area to be inaccurate. Therefore, the predefined area may include a plurality of wireless local area network access points to assist in estimating the location of the mobile devices. The use of access points to assist in location estimated of mobile user devices has its own set of challenges.

BRIEF DESCRIPTION OF THE DRAWINGS

FIG. 5 is a graph showing an estimated location of a mobile device and an associated plurality of test points to determine the orientation error of an access point, according to an example embodiment.

FIG. 6 is a high-level flowchart of a method for compensating for an orientation error for an access point, according to an example embodiment.

DESCRIPTION OF EXAMPLE EMBODIMENTS

Overview

Briefly, this disclosure is directed to determining an orientation error of one or more wireless access points within a predefined area, such as an indoor structure, to improve estimated location determinations of mobile devices located within the predefined area. Each access point has a plurality of antennas. When installed, the access point has an installation orientation in terms of how the access point antennas are oriented in two-dimensions. The predefined area may have an arbitrarily defined reference orientation, and due to the inherent unreliability of human installation of the access points, the installation orientation of the access point may not align with an orientation of the predefined area. A wireless mobile device sends a wireless transmission that is received at the plurality of antennas of the plurality of access points. The access points generate an angle of arrival estimate with respect to the wireless transmission received from the wireless mobile device. Based on the angle of arrival estimates, an estimated location is generated of the wireless mobile device. An orientation error is computed for each access point based on the angle of arrival estimate at each access point and the estimated location of the wireless mobile device. An adjusted orientation is generated for at least one of the access points based on the orientation error of each access point. The adjusted orientation is used in computations of location estimates of wireless mobile devices.

Example Embodiments

In wireless network situations, wireless access points (APs) are installed in various places, such as ceilings, walls, tables, etc., of a building in a predefined area or space. The predefined area may have an associated baseline reference orientation. This reference orientation may be arbitrarily defined or may be predetermined based on certain a priori observations and computations. However, during installation of APs, the orientation of each AP may not precisely align with the reference orientation associated with the predefined area. This may result in a less accurate location estimate of wireless mobile devices within the predefined area.

Figure 1:
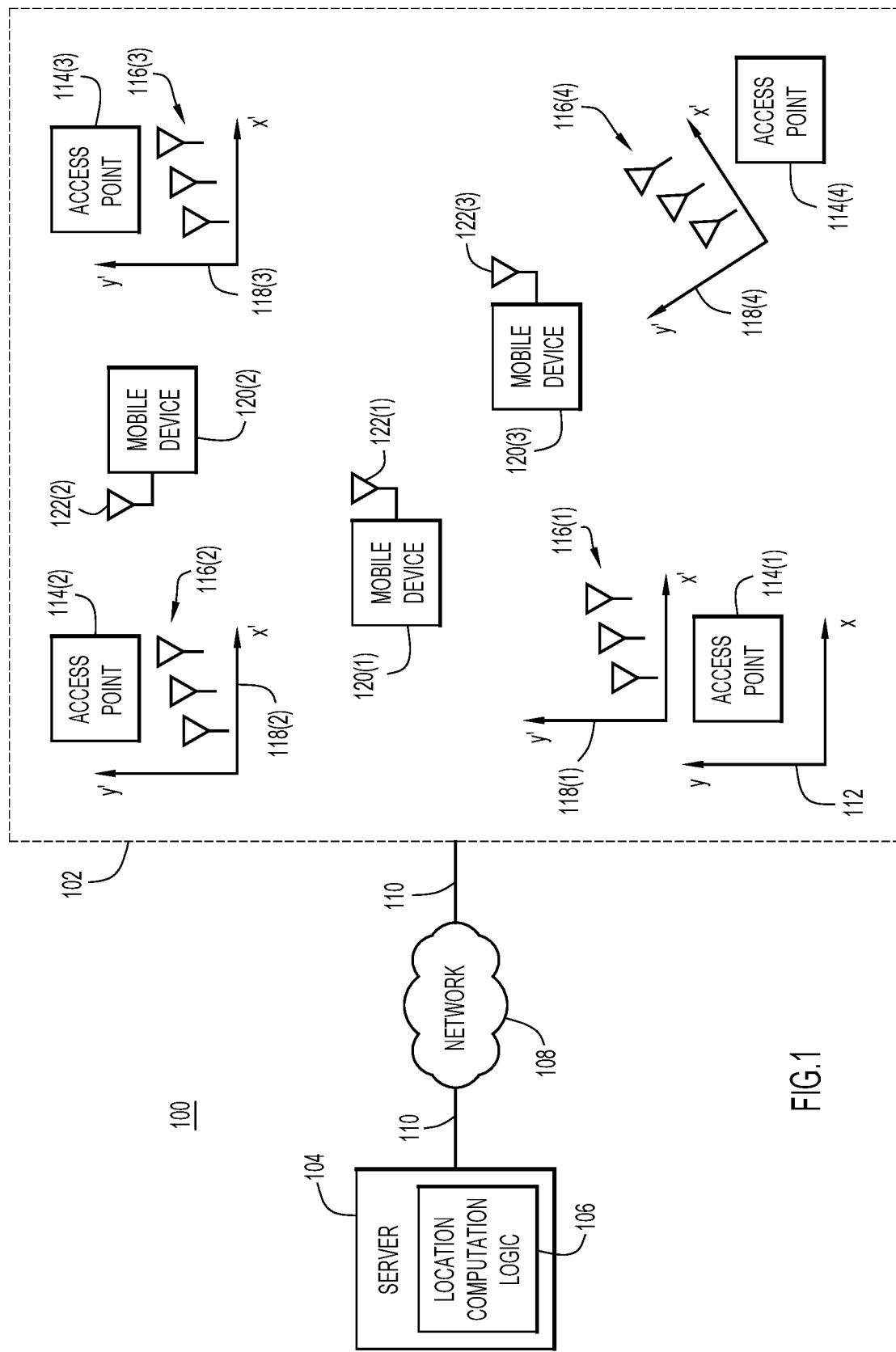
FIG. 1 is a block diagram of a system for compensating access point orientation errors, according to an example embodiment.

With reference made to FIG. 1, shown is a block diagram of a system 100 for compensating for AP orientation errors, according to an example embodiment. The system 100 includes a predefined area 102 denoted by the dashed lines and a server 104 running Location computation logic 106. The predefined area 102 may be, for example, an indoor structure, such as a room in a building a floor of a building, etc. Network elements, such as APs and wireless mobile devices, located within the predefined area 102 may communicate with the server 104 via network 108. The network elements located within the predefined area 102 and the server 104 may communicate with the network 108 via one or more communication links 110. The communication links 110 may be wired links, wireless links, or a combination of wired and wireless links.

The predefined area 102 may have an associated orientation 112, as indicated by the x-y axes. Located within the predefined area 102 are a plurality of network elements. The network elements may include a plurality of APs, such as APs 114(1), 114(2), 114(3), 114(4). Each of the plurality of APs 114(1)-114(4) may include a plurality of antennas denoted in the aggregate as antennas 116(1), 116(2), 116(3), 116(4). These antennas may be formed as an antenna array. The plurality of antennas 116(1)-116(4) may be in any arrangement capable of generating angle of arrival estimates. For example, the antennas may be in a substantially circular arrangement. The plurality of antennas 116(1)-116(4) may be enclosed within a structure or attached to a housing of the respective APs 114(1)-114(4). The mounting arrangement of the structure or housing of the APs may result in a respective orientation 118(1)-118(4) for the APs 114(1)-114(4). The orientations 118(1)-118(4) are indicated by the respective x'-y' axes. As shown in FIG. 1, the orientations 118(1)-118(3) for APs 114(1)-114(3) are substantially aligned with the orientation 112 of the predefined area 102. However, the orientation 118(4) of AP 114(4) is not aligned with the orientation 112 of the predefined area 102. This non-alignment of orientation 118(4) of AP 114(4) may result in a decreased accuracy of the location estimate of wireless mobile devices located within the predefined area 102. It should be appreciated that more than one of the APs 114(1)-114(4) may not align with the orientation 112 of the predefined area 102.

Also included within the predefined area 102 are a plurality of wireless mobile devices 120(1)-120(3). Each of the plurality of wireless mobile devices 120(1)-120(3) may include one or more antennas shown at reference numerals 122(1)-122(3) for sending a wireless transmission that may be received by one or more of the plurality of APs 114(1)-114(4). The APs 114(1)-114(4) may use the received transmission from a given one of the wireless mobile devices 120(1)-120(3) to generate an angle of arrival (AoA) estimate for that wireless mobile device. The AoA estimates may be used to determine estimated locations of the mobile devices 120(1)-120(3).

Each plurality of antennas 116(1)-116(4) of the APs 114(1)-114(4) may detect transmissions from the antennas of the mobile devices 120(1)-120(3). Based on the detected transmissions, the signals generated from detection by the plurality of antennas of the APs 114(1)-114(4) may be used to generate an AoA estimate of the transmission from the respective mobile device 120(1)-120(3). For example, the AoA estimates of the respective mobile devices 120(1)-120(3) may be generated based on the Multiple Signal Classification (MUSIC) algorithm, correlation, or other known or hereinafter developed methods.

The location computation logic 106 may use the AoA estimates from each AP 114(1)-114(4) to adjust for the error or offset between AP orientation and the reference orientation 112 in computing the AoA estimates at each AP for a given mobile wireless device, ultimately to compute an estimated location of the wireless mobile device. Based on the estimated locations of the wireless mobile devices 120(1)-120(3), the location computation logic 106 may generate an orientation error for each AP 114(1)-114(4). In other aspects, the location computation logic 106 may generate the orientation error for each AP 114(1)-114(4) based on locations of the APs 114(1)-114(4), a peak-to-average power ratio of the AoA estimates (described below) and location estimates of the mobile devices 120(1)-120(3) in addition to the AoA estimates. The location computation logic 106 may then use the estimated location to compute the orientation error for each AP 114(1)-114(4), as described below.

In one embodiment, the locations of the APs 114(1)-114(4) may be unknown. In this case, the location computation logic 106 may first determine the locations of the APs 114(1)-114(4). For example, the location computation logic 106 may use a generic line equation, shown below:

$$(y-y_0)=m(x-x_0)$$

In this equation, $y_0$ and $x_0$ represent the (x,y) coordinates, i.e., the location, of an AP. The slope of the line, m, is determined by the following equation:

$$m = \frac{\sin(\theta - \theta_0)}{\cos(\theta - \theta_0)}$$

Here, $\theta$ is the angle of the AoA estimate for the AP and $\theta_0$ is the orientation of the AP that is being determined by the location computation logic 106. Accordingly, for each estimated location of the wireless mobile device, there exists a value for $\theta$ for each AP. For each set of $\theta$, the location computation logic 106 assumes that the $\theta$'s represent lines that intersect at a point in space. Using numerous sets of $\theta$'s, the location computation logic 106 quantitatively determines values for $\theta_0$, $y_0$, and $x_0$. For example, the location computation logic 106 performs a linear regression for each wireless access point. The linear regression that results in the smallest sum of squared errors is used to estimate the location and orientation of a given AP. The squared errors is a squared value of the error between the point in space at which the AoA lines are assumed to intersect and lines generated as a function of $\theta_0$, $y_0$, and $x_0$. The values for $\theta_0$, $y_0$, and $x_0$ that result in the smallest sum of squared errors are the orientation and location of the APs 114(1)-114(4).

Figure 2:
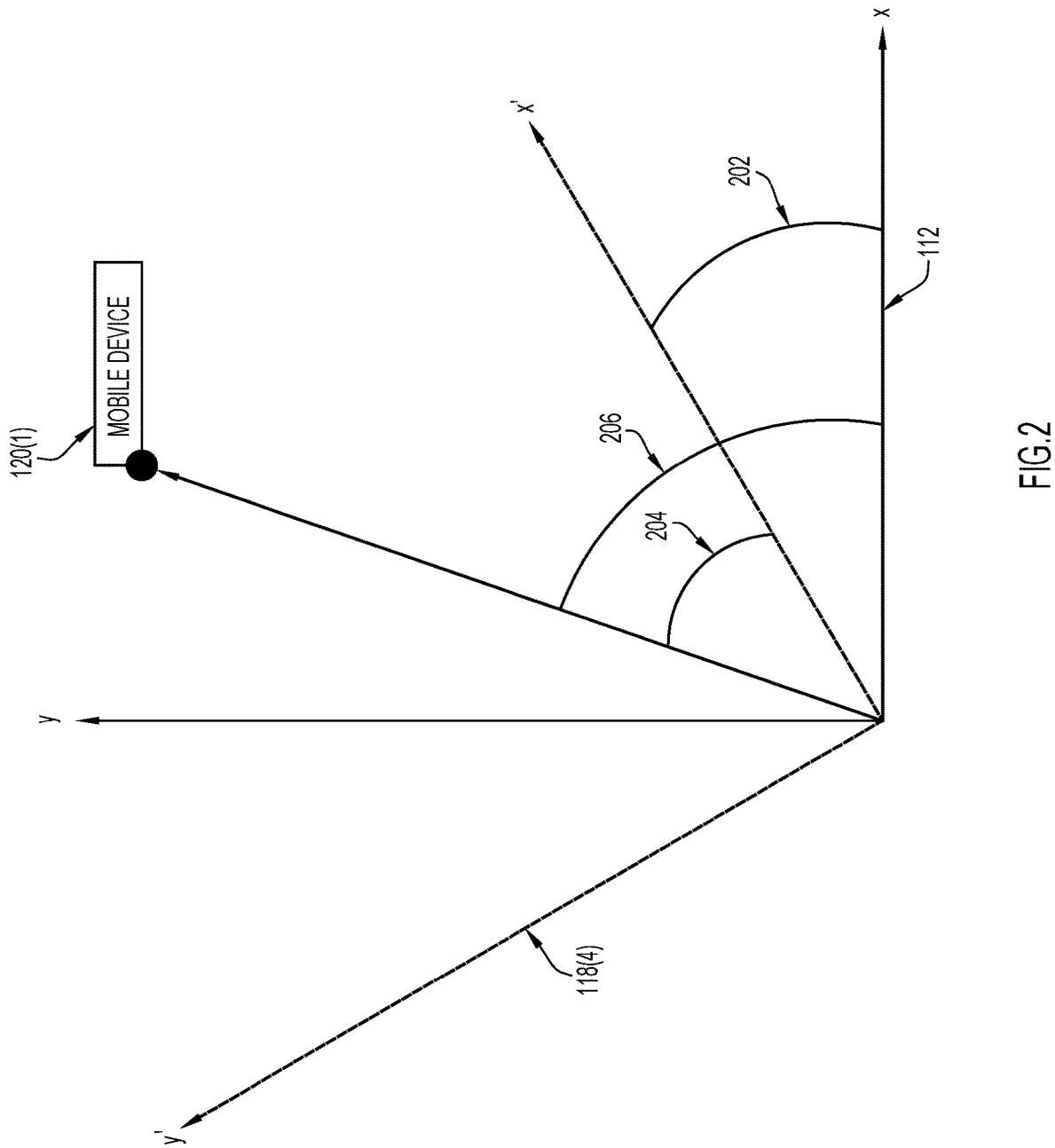
FIG. 2 shows an installation orientation of one access point superimposed on an orientation of a predefined area, according to an example embodiment.

Turning to FIG. 2, and with continuing reference to FIG. 1, the orientation 118(4) of AP 114(4) is shown as dashed x'-y' axes, superimposed on the orientation 112 of the predefined area 102, shown as solid x-y axes. The orientation 118(4) of AP 114(4) is not aligned with the orientation 112 of the predefined area 102. Therefore, the location computation logic 106 adjusts for the offset between the orientation 118(4) of AP 114(4) and the orientation 112 to improve location estimates of wireless mobile devices within the predefined area 102. An orientation error 202 of the orientation 118(4) of the AP 114(4) with respect to the orientation 112 of the predefined area 102 may be an angle difference between the orientation 118(4) of AP 114(4) and the orientation 112. To further illustrate the orientation error 202, a wireless mobile device, such as wireless mobile device 120(1), is also shown in FIG. 2. The AoA estimate of the mobile device 120(1) with respect to the orientation 118(4) of AP 114(4) is shown as angle 204. The AoA estimate of the mobile device 120(1) with respect to the orientation 112 of the predefined area 102 is shown as angle 206. The difference between the angle 206 and the angle 204 is the orientation error 202. As shown in FIG. 2, there may be a significant difference, i.e., the orientation error 202, in an AoA estimate of AP 114(4) when compared with the AoA estimate of the predefined area 102. This orientation error 202 may result in a less accurate location estimate of the wireless mobile device 120(1). The location computation logic 106 performs techniques to remove or compensate for the orientation error 202, thereby increasing the accuracy of the location estimate of the wireless mobile device 120(1).

It should be noted that the location computation logic 106 computes a mathematical solution to compensate for the orientation error 202. No physical adjustments to the installation orientations of the APs is or needs to be made.

Figure 3:
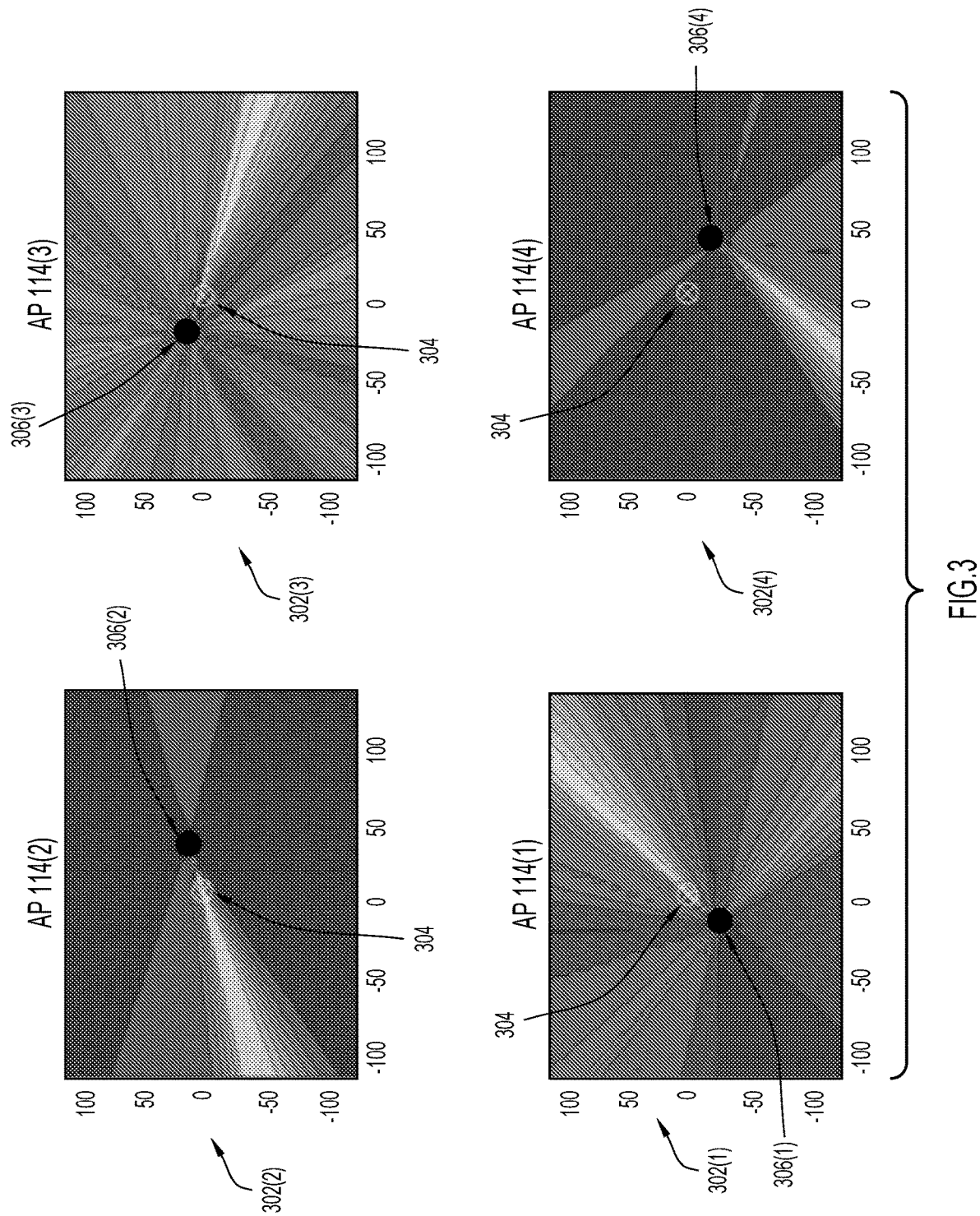
FIG. 3 shows a heat map showing angle of arrival estimates for a mobile device at each access point, according to an example embodiment.

Turning now to FIG. 3, and with continuing reference to FIGS. 1 and 2, there are shown a plurality of AoA heatmaps 302(1)-302(4) for AoA estimates for a mobile device at each of the APs 114(1)-114(4), according to an example embodiment. The AoA heatmaps 302(1)-302(4) depict an actual location 304 (an encircled "X") for a mobile device, such as wireless mobile device 120(1) with respect to a given AP in the heatmaps. The relative locations of the APs 114(1)-114(4) in the heatmaps are indicated at reference numerals 306(1)-306(4), respectively.

The rays emanating from the AP relative locations 306(1)—of the APs 114(1)-114(4) represent the AoA estimate for the wireless mobile device 120(1) with respect to each AP 114(1)-114(4). As shown, the rays of the APs 114(1)-114(3) intersect with the actual location 304 of the wireless mobile device 120(1). This indicates that the orientations 118(1)-118(3) are substantially aligned with the orientation 112 of the predefined area 102. However, the rays for AP 114(4) do not intersect with the actual location 304 of the mobile device 120(1). Instead, the rays for AP 114(4) are rotated approximately 90° from the actual location 304.

Therefore, the orientation 118(4) of AP 114(4) is rotated approximately 90° from the orientation 112 of the predefined area 102.

In addition to showing the AoA estimate for the wireless mobile device 120(1) with respect to each AP 114(1)-114(4), FIG. 3 also qualitatively shows a peak-to-average power ratio for the AoA estimate. The peak-to-average power ratio indicates a confidence of a given AP in its AoA estimate. For example, the rays for AP 114(2) are relatively narrowly concentrated in the direction of the actual location 304 of the wireless mobile device 120(1). This relatively narrow concentration of rays indicates a relatively high peak-to-average power ratio for AP 114(2). In contrast, APs 114(1), 114(3) have a relatively high number of rays emanating in directions other than the actual location 304 of the wireless mobile device 120(1). This relatively wide distribution may indicate a relatively low peak-to-average power ratio. The higher the peak-to-average power ratio, the greater the likelihood that the AoA estimate for the given AP is correct. Therefore, AoA estimates with high peak-to-average power ratio may be weighted more heavily when determining a location estimate of the wireless mobile device 120(1).

Using the AoA estimate for each of the AP 114(1)-114(4), the locations of the APs 114(1)-114(4), and the peak-to-average power ratio for each AoA estimate for each of the APs 114(1)-114(4), the location computation logic 106 may determine the estimated location of the wireless mobile device 120(1). The estimated location of the wireless mobile device 120(1) may then be used to determine the orientation error 202 for each AP 114(1)-114(4), as described in further detail below.

Figure 4A:
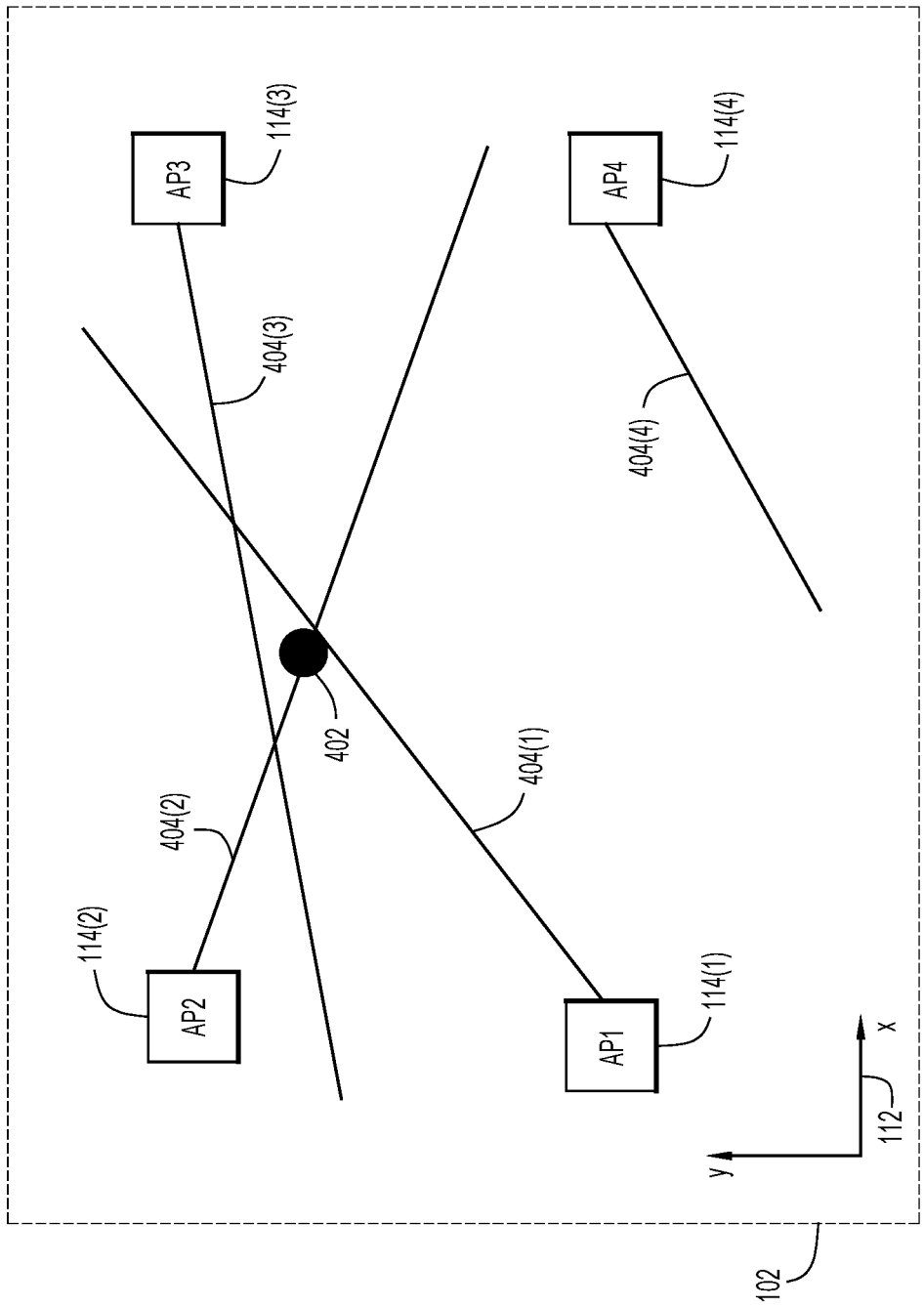
FIGS. 4A-4C show an application of the orientation error compensation techniques of this disclosure, according to an example embodiment.
Figure 4B:
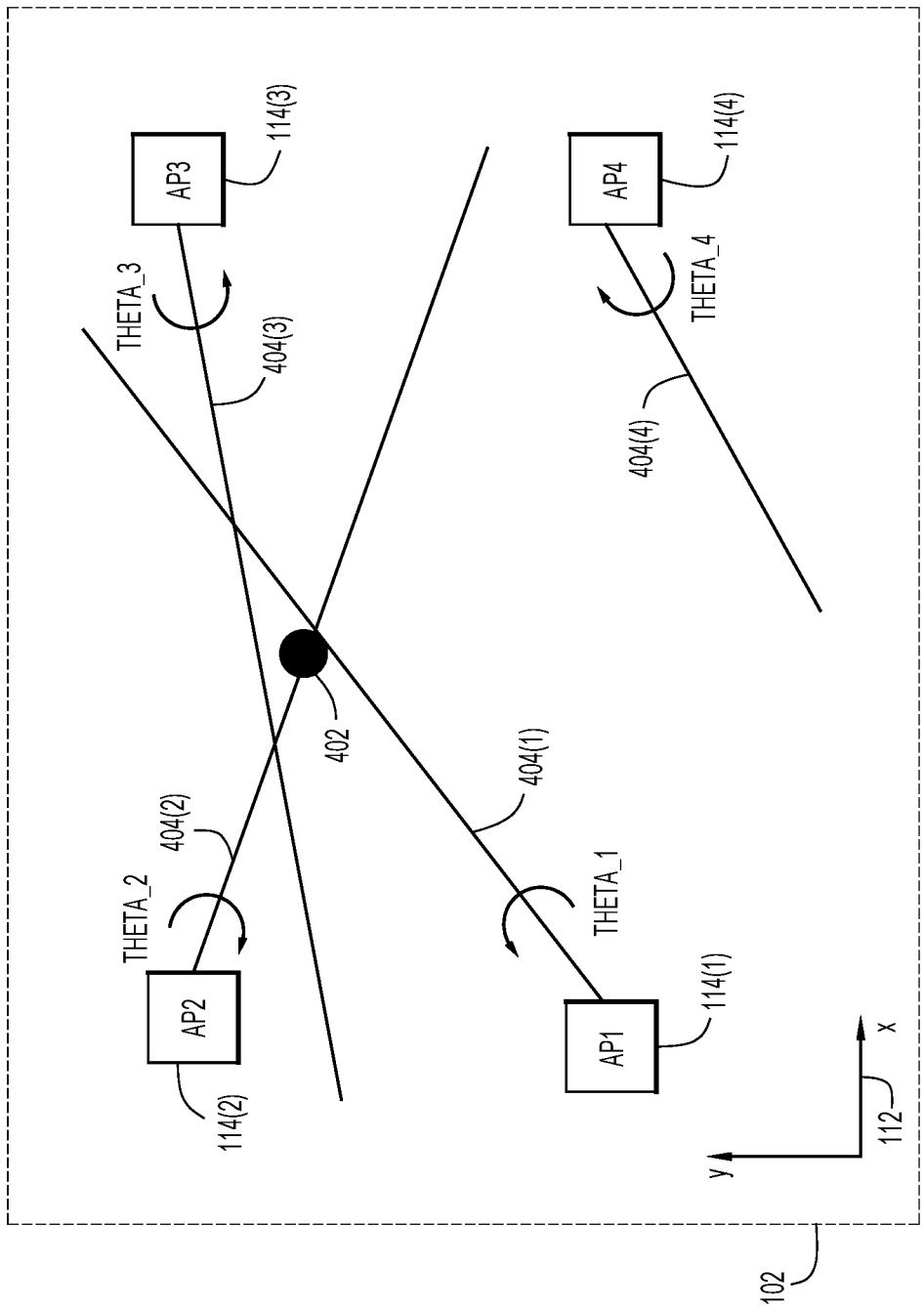
Figure 4C:
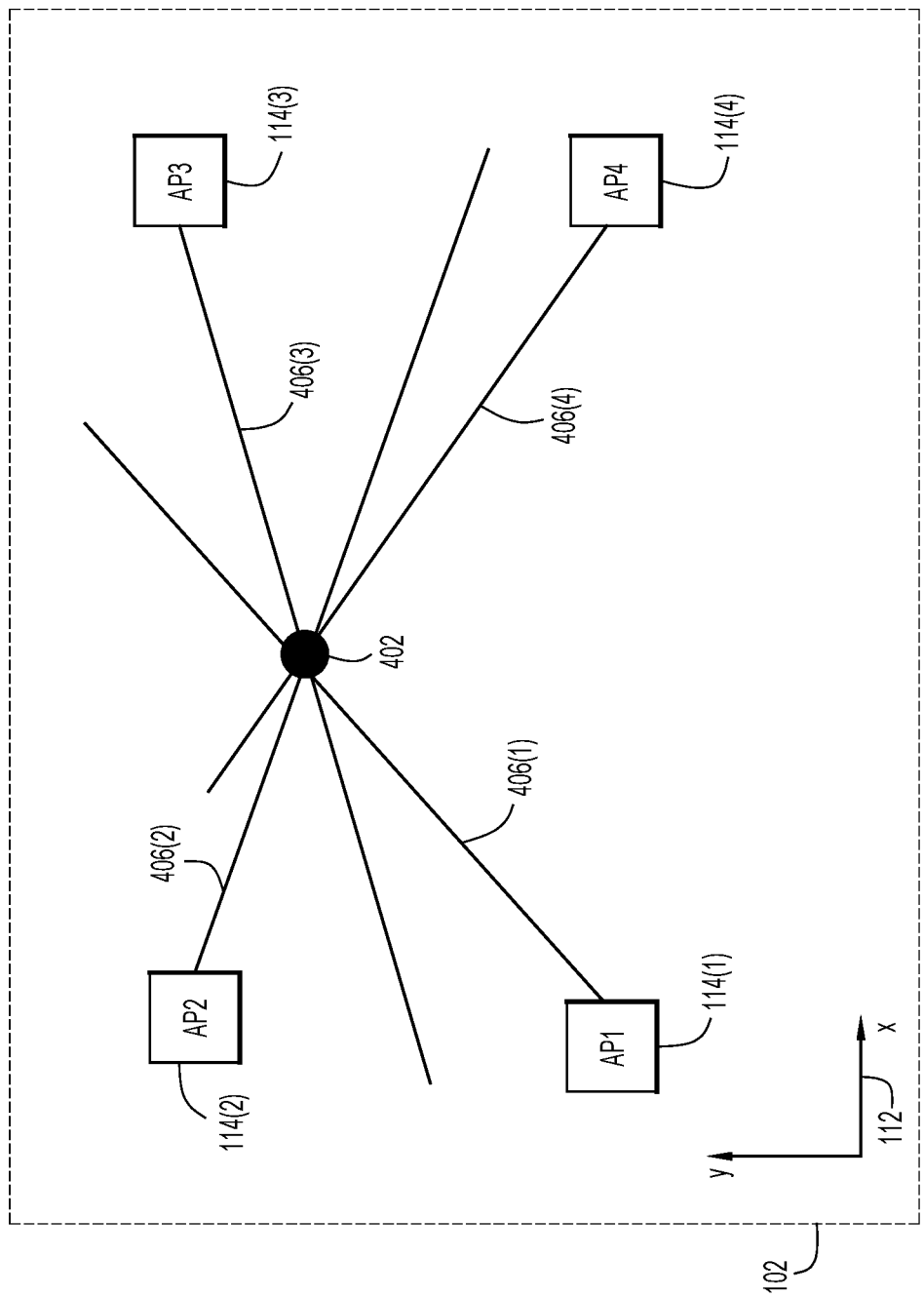

Turning to FIGS. 4A-4C, the orientation error compensation performed by the location computation logic 106 is described in more detail, according to an example embodiment. As shown in FIG. 4A, four APs 114(1)-114(4) and an estimated location 402 of a wireless mobile device, such as wireless mobile device 120(1), are shown within the predefined area 102. As described above, each of the APs 114(1)-114(4) may generate an AoA estimate based on transmissions received from the wireless mobile device 120(1). The AoA estimate for each AP 114(1)-114(4) is indicated by lines 404(1)-404(4), respectively, extending from each AP 114(1)-114(4), respectively. The estimated location 402 of the wireless mobile device 120(1) may be based on the AoA estimates for each AP 114(1)-114(4), the locations of each AP 114(1)-114(4), and/or peak-to-average power ratios for each AoA estimate, as described above.

The AoA estimate 404(1) for AP 114(1) is in the general direction of the estimated location 402 of the wireless mobile device 120(1). However, the AoA estimate 404(1) does not intersect with the estimated location 402 of the wireless mobile device 120(1), indicating that there may be a slight orientation error 202 for AP 114(1) with respect to the orientation 112 of the predefined area 102. The AoA estimate 404(2) for AP 114(2) intersects the estimated location 402 of the wireless mobile device 120(1), indicating that there may be little or no orientation error 202 for AP 114(2) with respect to the orientation 112 of the predefined area 102. The AoA estimate 404(3) for AP 114(3), like the AoA estimate 404(1) for AP 114(1), is in the general direction of the estimated location 402 of the wireless mobile device 120(1). However, AoA estimate 404(3) also fails to intersect the estimated location 402, indicating that there may be a slight orientation error 202 for AP 114(3) with respect to the orientation 112 of the predefined area 102. In contrast, the AoA estimate 404(4) for AP 114(4) is not in the general direction of the estimated location 402 of the wireless mobile device 120(1). This indicates that there may be a significant, non-negligible orientation error 202 for AP 114(4) with respect to the orientation 112 of the predefined area 102.

In one aspect of this disclosure, orientation estimates based on estimated locations of the wireless mobile device 120(1) that are within a convex hull of the set of APs 114(1), 114(2), 114(3), 114(4) may have be assigned a greater weight by the location computation logic 106. These estimated locations may be assigned a greater weight because estimated locations within the convex hull are typically more accurate and may lead to a better orientation error determination.

FIG. 4B shows one technique for determining the orientation error 202 for each of the APs 114(1)-114(4) after the estimated location 402 of the mobile device 120(1) and the AoA estimates for each AP 114(1)-114(4) are determined, according to an example embodiment. The orientation error 202 for each AP 114(1-114(4) may be computed by determining a difference between the AoA estimate of the wireless mobile device 120(1) for each AP 114(1)-114(4) and the angle of the estimated location 402 of the wireless mobile device 120(1) with respect to each AP 114(1)-114(4). For example, as shown in FIG. 4B, the AoA estimate for AP 114(1) may be rotated, or adjusted, by an amount Theta_1, the AoA estimate for AP 114(2) may be rotated, or adjusted, by an amount Theta_2, the AoA estimate for AP 114(3) may be rotated, or adjusted, by an amount Theta_3, and the AoA estimate for AP 114(4) may be rotated, or adjusted, by an amount Theta_4. As described above, the location computation logic 106 rotates/adjusts the orientations computationally to compensate for the orientation error 202 for each AP 114(1)-114(4).

Proceeding to FIG. 4C, shown are the compensated, or adjusted, AoA estimates 406(1), 406(2), 406(3), 406(4) for each AP 114(1)-114(4) based on the orientation error 202 for each AP 114(1)-114(4), as described above in FIG. 4B. As shown in FIG. 4B, the compensated, or adjusted, AoA estimates 406(1)-406(4) intersect close to the estimated location 402 of the wireless mobile device 120(1). In this manner, the orientations of each AP 114(1)-114(4) may be compensated, or adjusted, to substantially align with the orientation 112 of the predefined area 102. This, in turn, may result in a more accurate location estimate for the mobile device 120(1).

FIG. 5, with continuing reference to FIGS. 1 and 2, shows a plot 500 depicting a technique to determine the orientation error 202 for each AP 114(1)-114(4) using a plurality of test points 502(1)-502(N), according to an example embodiment. The plot 500 includes an AP orientation, such as the orientation 118(4) of AP 114(4) shown in dashed lines for x'-y' axes, superimposed on the orientation 112 of the predefined area 102 shown in solid lines for x-y axes. Also shown in the plot 500 is the estimated location 504 of a wireless mobile device, such as wireless mobile device 120(1). The estimated location 504 of the wireless mobile device 120(1) may be based on one or more of the AoA estimates of the mobile device 120(1) at each AP 114(1)-114(4), the locations of each of the APs 114(1)-114(4), and the peak-to-average power ratio for each of the APs 114(1-114(4). The plot 500 also includes the plurality of test points 502(1)-502(N), which are described in more detail below.

As discussed above, the actual location of the wireless mobile device 120(1) is usually unknown. Therefore, to determine an orientation error 202 for each AP 114(1)-114(4), the estimated location 504, which may be generated as described above, of the wireless mobile device 120(1) may be used. To determine the orientation error 202 of each AP 114(1)-114(4), the location computation logic 106 may generate a set of test points 502(1)-502(N) which are candidate locations for estimated location 504 of the wireless mobile device 120(1). For example, 50 test points may be used for the estimated location 504 of the wireless mobile device 120(1). Orientation estimates are computed for each AP 114(1)-114(4) with respect to each test point 502(1)-502(N). These orientation estimates may be stored in, for example, a matrix. For a given estimated location 504 of the wireless mobile device 120(1), a matrix of orientation estimates is computed for each of the APs 114(1)-114(4), using the plurality of test points 502(1)-502(N).

To determine which of the plurality of test points 502(1)-502(N) is closest to the estimated location of the mobile device 120(1), the location computation logic 106 may correlate the orientation estimates for each of the APs 114(1),-114(4) using the plurality of test points 502(1)-502(N) with the AoA estimates of the estimated location 504 of the mobile device 120(1). For example, the location computation logic 106 may use a correlation matrix to determine which of the orientation estimates, using the plurality of test points 502(1)-502(N), is closest to the estimated location 504 of the mobile device 120(1).

An orientation error is computed for each of the APs 114(1)-114(4) based on the test point that is closest to the estimated location 504 of the mobile device 120(1). For example, the location computation logic 106 may compute orientation error 202 for a given AP by computing a difference between the orientation estimate with respect to the estimated location 504 of the mobile device 120(1) and the orientation estimate with respect to the test point closest to the estimated location 504 of the mobile device 120(1). The location computation logic 106 may then use the orientation error 202 to adjust the AoA estimate for each AP 114(1)-114(4). The adjusted AoA estimates may then be used to compute a more accurate location estimate 504 of the mobile device 120(1).

Turning to FIG. 6, a high-level flowchart is shown of a method 600 for compensating for an orientation error for an AP, according to an example embodiment. Reference is also made to FIG. 1 for purposes of the description of the flowchart of FIG. 6. The operations of method 600 are performed by the location computation logic 106 running on the server 104. It is to be understood, however, that the method 600 may be performed on any device having suitable computational resources, such as any one of the APs depicted in FIG. 1.

The method 600 is a high-level encapsulation of the operations described above in connection with FIGS. 1-3, 4A-4C, and 5, to compute and compensate for an installation orientation error of an AP. The method 600 begins at operation 602. The location computation logic 106 obtains an AoA estimate of a wireless transmission from a wireless mobile device, such as wireless mobile device 120(1), located within the predefined area 102. The location computation logic 106 obtains the AoA estimate from each of the APs 114(1)-114(4) that received the wireless transmission from the wireless mobile device 120(1). The predefined area 102 has an associated orientation 112 and each of the APs 114(1)-114(4) also has an associated installation orientation 118(1)-118(4). The installation orientations 118(1)-118(4) are based on, and affect, the physical orientation of the plurality of antennas of the APs 114(1)-114(4), which in turn affects the AoA estimate that a given AP computes. As described above, one or more of the associated installation orientations 118(1)-118(4) may be different from the orientation 112 of the predefined area 102. The difference between the installation orientations 118(1)-118(4) and the orientation 112 is also referred to as the orientation error for each AP 114(1)-114(4), respectively.

At operation 604, the location computation logic 106 generates an estimated location of the wireless mobile device 120(1) based on the AoA estimates received from the APs 114(1)-114(4) in operation 602. In some embodiments, the location computation logic 106 may also use a location of each of the APs 114(1)-114(4) to generate the estimated location of the wireless mobile device 120(1). In other embodiments, the location computation logic 106 may also use the peak-to-average power ratio of the AoA estimates to generate the estimated location of the wireless mobile device 120(1). For example, the location computation logic 106 may assign greater weight to AoA estimates with higher peak-to-average power ratios because higher peak-to-average power ratios represent greater confidence in the AoA estimate. Therefore, by assigning a greater weight to AoA estimates with higher peak-to-average power ratios, the location computation logic 106 may generate a more accurate estimated location of the wireless mobile device 120(1).

At operation 606, the location computation logic 106 determines an orientation error 202 for each of the APs 114(1)-114(4). The orientation error is computed based on the AoA estimate for a given AP and the estimated location of the wireless mobile device 120(1) generated in operation 604. The orientation error 202 of a given AP is the difference between the AoA estimate obtained from the given AP in operation 602 and the angle the estimated location of the wireless mobile device 120(1) makes with the given AP.

At operation 608, the location computation logic 106 generates an adjusted orientation for each AP 114(1)-114(4) that is aligned with the orientation 112 of the predefined area 102. The location computation logic 106 may compute the adjusted orientation based on the orientation error 202 computed in operation 606.

Figure 7:
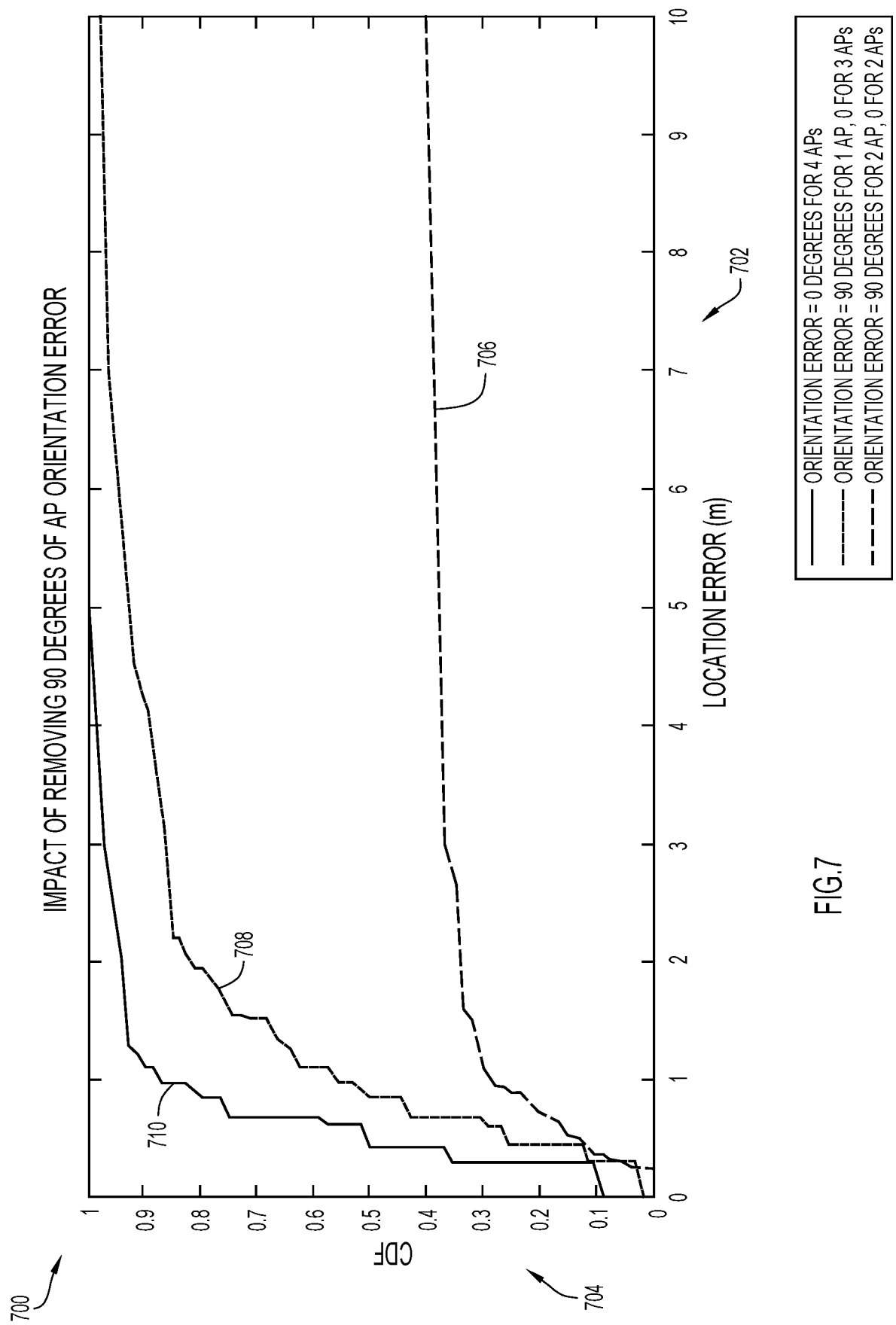
FIG. 7 illustrates cumulative distribution function plots showing a location error of a wireless mobile device as a function of access point orientation error, according to an example embodiment.

FIG. 7 shows plots 700 of cumulative distribution functions (CDFs) obtained from experiments and showing a location error of a wireless mobile device as a function of AP orientation error, according to an example embodiment. The location error 702 is plotted along the x axis and a cumulative probability 704 is plotted along the y axis. Three CDF curves 706, 708, and 710 are shown. CDF curve 706 represents the probability of a location error of the wireless mobile device 120(1) when two APs have installation orientations that are rotated by 90° with respect to the orientation of the predefined area. CDF curve 708 represents the probability of a location error of the wireless mobile device when one AP has an installation orientation that is rotated by 90° with respect to the orientation of the predefined area. CDF curve 710 represents the probability of a location error of the wireless mobile device when all 4 of the APs have orientations that are aligned with the orientation of the predefined area.

As shown in FIG. 7, the CDF curve 706, which shows the probability of the scenario where two APs are rotated by 90°, indicates that the probability of generating a location estimate of the wireless mobile device within one meter of the actual location of the wireless mobile device is approximately 30%. The CDF curve 708, which shows the probability of the scenario where one AP is rotated by 90°, indicates that the probability of generating a location estimate of the wireless mobile device within one meter of the actual location of the wireless mobile device is approximately 55%. The CDF curve 710, which shows the probability of the scenario where all 4 APs are aligned with the orientation of the predefined area, indicates that the probability of generating a location estimate of the wireless mobile device within one meter of the actual location of the wireless mobile device is approximately 90%.

The plots 700 illustrate the benefits of compensating for AP orientation errors when computing location estimates of a wireless mobile device. The location computation logic 106 approximately triples the probability that a given location estimate for a wireless mobile device will be accurate within one meter when two AP orientations are compensated for so as to align with the orientation of the predefined area.

Figure 8:
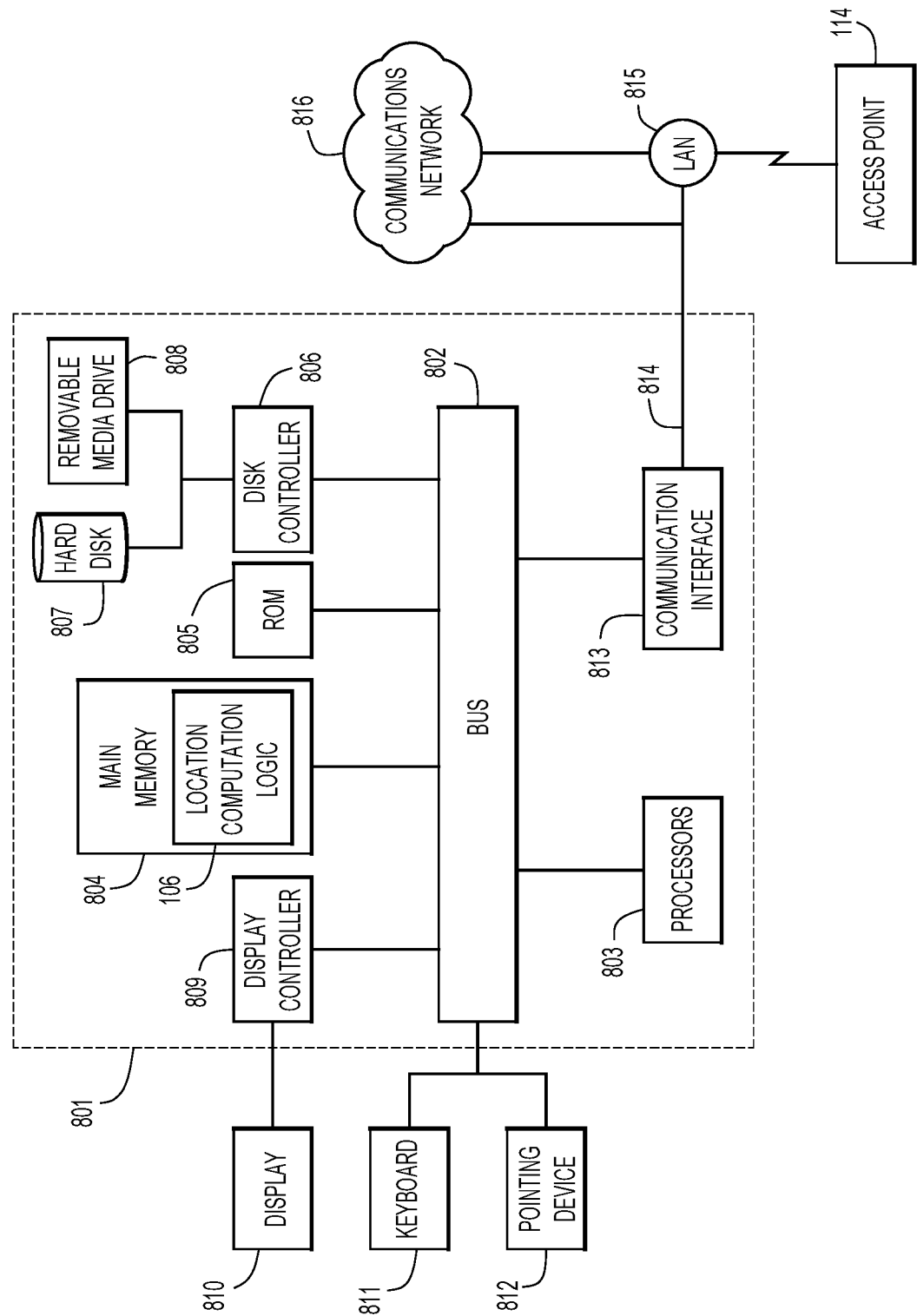
FIG. 8 is a block diagram of a server configured to perform access point orientation compensation techniques, according to an example embodiment.

FIG. 8 is a block diagram showing a server, e.g., server 104 shown in FIG. 1, configured to perform AP orientation compensation techniques when computing a location of a wireless mobile device, according to an example embodiment. FIG. 8 illustrates a computer system 801 upon which the embodiments presented may be implemented. The computer system 801 includes a bus 802 or other communication mechanism for communicating information, and a processor 803 coupled with the bus 802 for processing the information. While the figure shows a signal block 803 for a processor, it should be understood that the processors 803 represent a plurality of processing cores, each of which can perform separate processing. The computer system 801 also includes a main memory 804, such as a random access memory (RAM) or other dynamic storage device (e.g., dynamic RAM (DRAM), static RAM (SRAM), and synchronous DRAM (SD RAM)), coupled to the bus 802 for storing information and instructions to be executed by processor 803. In addition, the main memory 804 may be used for storing temporary variables or other intermediate information during the execution of instructions by the processor 803.

The computer system 801 further includes a read only memory (ROM) 805 or other static storage device (e.g., programmable ROM (PROM), erasable PROM (EPROM), and electrically erasable PROM (EEPROM)) coupled to the bus 802 for storing static information and instructions for the processor 803.

The computer system 801 also includes a disk controller 806 coupled to the bus 802 to control one or more storage devices for storing information and instructions, such as a magnetic hard disk 807, and a removable media drive 808 (e.g., floppy disk drive, read-only compact disc drive, read/write compact disc drive, compact disc jukebox, tape drive, and removable magneto-optical drive). The storage devices may be added to the computer system 801 using an appropriate device interface (e.g., small computer system interface (SCSI), integrated device electronics (IDE), enhanced-IDE (E-IDE), direct memory access (DMA), or ultra-DMA).

The computer system 801 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 801 may also include a display controller 809 coupled to the bus 802 to control a display 810, such as a liquid crystal display or light emitting diode display, for displaying information to a computer user. The computer system 801 includes input devices, such as a keyboard 811 and a pointing device 812, for interacting with a computer user and providing information to the processor 803. The pointing device 812, for example, may be a mouse, a trackball, or a pointing stick for communicating direction information and command selections to the processor 803 and for controlling cursor movement on the display 810.

The computer system 801 performs a portion or all of the processing steps of the process in response to the processor 803 executing one or more sequences of one or more instructions contained in a memory, such as the main memory 804. Such instructions may be read into the main memory 804 from another computer readable medium, such as a hard disk 807 or a removable media drive 808. One or more processors in a multi-processing arrangement may also be employed to execute the sequences of instructions contained in main memory 804. In alternative embodiments, hard-wired circuitry may be used in place of or in combination with software instructions. Thus, embodiments are not limited to any specific combination of hardware circuitry and software.

As stated above, the computer system 801 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium.

Stored on any one or on a combination of non-transitory computer readable storage media, embodiments presented herein include software for controlling the computer system 801, for driving a device or devices for implementing the process, and for enabling the computer system 801 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 801 also includes a communication interface 813 coupled to the bus 802. The communication interface 813 provides a two-way data communication coupling to a network link 814 that is connected to, for example, a local area network (LAN) 815, or to another communications network 816 such as the Internet. For example, the communication interface 813 may be a wired or wireless network interface card to attach to any packet switched (wired or wireless) LAN. As another example, the communication interface 813 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 813 sends and receives electrical, electromagnetic or optical signals that carry digital data streams representing various types of information.

The network link 814 typically provides data communication through one or more networks to other data devices. For example, the network link 814 may provide a connection to another computer through a local area network 815 (e.g., a LAN) or through equipment operated by a service provider, which provides communication services through a communications network 816. The local network 814 and the communications network 816 use, for example, electrical, electromagnetic, or optical signals that carry digital data streams, and the associated physical layer (e.g., CAT 5 cable, coaxial cable, optical fiber, etc.). The signals through the various networks and the signals on the network link 814 and through the communication interface 813, which carry the digital data to and from the computer system 801 maybe implemented in baseband signals, or carrier wave based signals. The computer system 801 can transmit and receive data, including program code, through the network(s) 815 and 816, the network link 814 and the communication interface 813. Moreover, the network link 814 may provide a connection through a LAN 815 to a mobile device 817 such as a personal digital assistant (PDA) laptop computer, or cellular phone.

In summary, a method for compensating orientation errors of an AP with respect to an orientation of a predefined area is disclosed. The method includes obtaining, from a plurality of wireless access points located within a predefined area, an angle of arrival estimate of a wireless transmission from a wireless mobile device that is received at a plurality of antennas of each respective wireless access point, each wireless access point having a respective installation orientation; generating an estimated location of the wireless mobile device based on the angle of arrival estimate at each of the plurality of wireless access points; determining an orientation error for each wireless access point based on the angle of arrival estimates at the plurality of wireless access points and the estimated location of the wireless mobile device; and generating, based on the orientation error for each wireless access point, an adjusted orientation for at least one of the wireless access point that is aligned with an orientation of the predefined area.

The method for compensating for AP orientation errors further includes generating a modified angle of arrival estimate for each wireless access point based on the adjusted orientation of each wireless access point; and generating a modified estimated location of the wireless mobile device based on the modified angle of arrival estimates from the plurality of wireless access points.

The method may also, when generating the estimated location of the wireless mobile device, determine a peak-to-average power ratio of the angle of arrival estimate for each wireless access point; weight the angle of arrival estimate for each wireless access point such that angle of arrival estimates with greater peak-to-average power ratios have a greater weight, to produce weighted angle of arrival estimates; and compute the estimated location of the mobile device using the weighted angle of arrival estimates.

In another embodiment, the method determines a location of each wireless access point. Additionally, generating the estimated location of the wireless mobile device is further based on the location of each wireless access point.

In another aspect, the location of each wireless access point is determined based on minimizing a sum of squared errors of the respective orientation of each wireless access point with respect to the estimated location of the wireless mobile device.

Determining the orientation error may further include computing a rotation of the respective installation orientation of each wireless access point so that the angle of arrival estimate for the respective wireless access point intersects with the estimated location of the wireless mobile device. Additionally, the orientation error for each wireless access point is based on the rotation of the respective orientation of the respective access point.

In another embodiment, determining the orientation error further includes generating a plurality of test points associated with the estimated location of the wireless mobile device, generating a plurality of orientation estimates for each wireless access point based on the plurality of test points, correlating the plurality of orientation estimates for each wireless access point with the angle of arrival estimates of the wireless mobile device at each wireless access point, and determining, based on the correlating, the orientation error for each wireless access point.

In yet another aspect, determining the orientation error further includes weighting estimated locations of the wireless mobile device such that the estimated locations within a convex hull of the wireless access points have a greater weight than estimated locations of the wireless mobile device that are outside the convex hull.

In another embodiment, an apparatus including a communication interface configured to enable network communications and a processing device coupled with the communication interface. The processing device is configured to obtain, from a plurality of wireless access points located within a predefined area, an angle of arrival estimate of a wireless transmission from a wireless mobile device that is received at a plurality of antennas of each respective wireless access point, each wireless access point having a respective installation orientation; generate an estimated location of the wireless mobile device based on the angle of arrival estimate at each of the plurality of wireless access points; determine an orientation error for each wireless access point based on the angle of arrival estimates at the plurality of wireless access points and the estimated location of the wireless mobile device; and generate, based on the orientation error for each wireless access point, an adjusted orientation for at least one of the wireless access points that is aligned with an orientation of the predefined area.

In yet another embodiment, one or more non-transitory computer readable storage media encoded with instructions is disclosed. The instructions cause a processor to obtain, from a plurality of wireless access points located within a predefined area, an angle of arrival estimate of a wireless transmission from a wireless mobile device that is received at a plurality of antennas of each respective wireless access point, each wireless access point having a respective installation orientation; generate an estimated location of the wireless mobile device based on the angle of arrival estimate at each of the plurality of wireless access points; determine an orientation error for each wireless access point based on the angle of arrival estimates at the plurality of wireless access points and the estimated location of the wireless mobile device; and generate, based on the orientation error for each wireless access point, an adjusted orientation for at least one of the wireless access points that is aligned with an orientation of the predefined area.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   obtaining, from each of a plurality of wireless access points that (i) is located within a predefined area having a reference orientation, and (ii) has a plurality of antennas associated with an installation orientation and that are configured to receive a wireless transmission from a wireless mobile device, an angle of arrival estimate of the wireless transmission with respect to the installation orientation;

generating an estimated location of the wireless mobile device based on the angle of arrival estimate with respect to the installation orientation at each of the plurality of wireless access points;

determining an orientation error between the reference orientation and the installation orientation for each wireless access point based on the angle of arrival estimate with respect to the installation orientation at each of the plurality of wireless access points and the estimated location of the wireless mobile device; and generating, based on the orientation error and the installation orientation for each wireless access point, an adjusted installation orientation for at least one of the wireless access points that is aligned with the reference orientation of the predefined area.

2. The method of claim 1, further comprising:
generating a modified angle of arrival estimate for each wireless access point based on the adjusted installation orientation of each wireless access point; and
generating a modified estimated location of the wireless mobile device based on the modified angle of arrival estimates from the plurality of wireless access points.

3. The method of claim 1, wherein generating the estimated location of the wireless mobile device further comprises:
determining a peak-to-average power ratio of the angle of arrival estimate for each wireless access point;
weighting the angle of arrival estimate for each wireless access point such that angle of arrival estimates with greater peak-to-average power ratios have a greater weight, to produce weighted angle of arrival estimates; and
computing the estimated location of the wireless mobile device using the weighted angle of arrival estimates.

4. The method of claim 1, further comprising:
determining a location of each wireless access point; and
wherein generating the estimated location of the wireless mobile device is further based on the location of each wireless access point.

5. The method of claim 1, wherein the reference orientation is represented as x-y axes and the installation orientation of each wireless access point is represented as x'-y' axes rotated from the x-y axes by the orientation error for each wireless access point.

6. The method of claim 1, wherein determining the orientation error further comprises:
computing a rotation of the installation orientation of each wireless access point so that the angle of arrival estimate for each wireless access point intersects with the estimated location of the wireless mobile device, and
wherein the orientation error for each wireless access point is based on the rotation of the installation orientation of each wireless access point.

7. The method of claim 1, wherein determining the orientation error further comprises:
generating a plurality of test points associated with the estimated location of the wireless mobile device;
generating a plurality of installation orientation estimates for each wireless access point based on the plurality of test points;

correlating the plurality of installation orientation estimates for each wireless access point with the angle of arrival estimates of the wireless mobile device at each wireless access point; and
determining, based on the correlating, the orientation error for each wireless access point.

8. The method of claim 1, wherein determining the orientation error for each wireless access point further comprises:
weighting estimated locations of the wireless mobile device such that [[the]] estimated locations within a convex hull of the wireless access points have a greater weight than estimated locations of the wireless mobile device that are outside the convex hull.

9. An apparatus comprising:
a communication interface configured to enable network communications;
a processing device coupled with the communication interface, and configured to:
obtain, from each of a plurality of wireless access points that (i) is located within a predefined area having a reference orientation, and (ii) has a plurality of antennas associated with an installation orientation and that are configured to receive a wireless transmission from a wireless mobile device, an angle of arrival estimate of the wireless transmission with respect to the installation orientation;
generate an estimated location of the wireless mobile device based on the angle of arrival estimate with respect to the installation orientation at each of the plurality of wireless access points;
determine an orientation error between the reference orientation and the installation orientation for each wireless access point based on the angle of arrival estimate with respect to the installation orientation at each of the plurality of wireless access points and the estimated location of the wireless mobile device; and
generate, based on the orientation error and the installation orientation for each wireless access point, an adjusted installation orientation for at least one of the wireless access points that is aligned with the reference orientation of the predefined area.

10. The apparatus of claim 9, wherein the processing device is further configured to:
generate a modified angle of arrival estimate for each wireless access point based on the adjusted installation orientation of each wireless access point; and
generate a modified estimated location of the wireless mobile device based on the modified angle of arrival estimates from the plurality of wireless access points.

11. The apparatus of claim 9, wherein the processing device is further configured to:
determine a peak-to-average power ratio of the angle of arrival estimate for each wireless access point;
weight the angle of arrival estimate for each wireless access point such that angle of arrival estimates with greater peak-to-average power ratios have a greater weight, to produce weighted angle of arrival estimates; and
compute the estimated location of the wireless mobile device using the weighted angle of arrival estimates.

12. The apparatus of claim 9, wherein the processing device is further configured to:
determine a location of each wireless access point, and generate the estimated location of the wireless mobile device based on the location of each wireless access point.

13. The apparatus of claim 9, wherein the reference orientation is represented as x-y axes and the installation orientation of each wireless access point is represented as x'-y' axes rotated from the x-y axes by the orientation error for each wireless access point.

14. The apparatus of claim 9, wherein the processing device is further configured to:
compute a rotation of the installation orientation of each wireless access point so that the angle of arrival estimate for each wireless access point intersects with the estimated location of the wireless mobile device, and
wherein the orientation error for each wireless access point is based on the rotation of the installation orientation of each wireless access point.

15. The apparatus of claim 9, wherein the processing device is further configured to:
generate a plurality of test points associated with the estimated location of the wireless mobile device;
generate a plurality of installation orientation estimates for each wireless access point based on the plurality of test points;
correlate the plurality of installation orientation estimates for each wireless access point with the angle of arrival estimates of the wireless mobile device at each wireless access point; and
determine, based on the correlation, the orientation error for each wireless access point.

16. The apparatus of claim 9, wherein the processing device is further configured to:
weight estimated locations of the wireless mobile device such that estimated locations within a convex hull of the wireless access points have a greater weight than estimated locations of the wireless mobile device that are outside the convex hull.

17. One or more non-transitory computer readable storage media encoded with instructions that, when executed by a processor, cause the processor to:
obtain, from each of a plurality of wireless access points that (i) is located within a predefined area having a reference orientation, and (ii) has a plurality of antennas associated with an installation orientation and that are configured to receive a wireless transmission from a wireless mobile device, an angle of arrival estimate of the wireless transmission with respect to the installation orientation;
generate an estimated location of the wireless mobile device based on the angle of arrival estimate with respect to the installation orientation at each of the plurality of wireless access points;
determine an orientation error between the reference orientation and the installation orientation for each wireless access point based on the angle of arrival estimate with respect to the installation orientation at each of the plurality of wireless access points and the estimated location of the wireless mobile device; and
generate, based on the orientation error and the installation orientation for each wireless access point, an adjusted installation orientation for at least one of the wireless access points that is aligned with the reference orientation of the predefined area.

18. The one or more non-transitory computer readable storage media of claim 17, wherein the instructions further cause the processor to:
generate a modified angle of arrival estimate for each wireless access point based on the adjusted installation orientation of each wireless access point; and
generate a modified estimated location of the wireless mobile device based on the modified angle of arrival estimates from the plurality of wireless access points.

19. The one or more non-transitory computer readable storage media of claim 17, wherein the instructions further cause the processor to:
determine a peak-to-average power ratio of the angle of arrival estimate for each wireless access point;
weight the angle of arrival estimate for each wireless access point such that angle of arrival estimates with greater peak-to-average power ratios have a greater weight, to produce weighted angle of arrival estimates; and
compute the estimated location of the wireless mobile device using the weighted angle of arrival estimates.

20. The one or more non-transitory computer readable storage media of claim 17, wherein the instructions further cause the processor to:
determine a location of each wireless access point, and
generate the estimated location of the wireless mobile device based on the location of each wireless access point.

* * * * *